United States Patent [19]

Carlson

[11] 4,298,502
[45] Nov. 3, 1981

[54] CATALYTIC COMPOSITE PARTICULARLY USEFUL FOR THE OXIDATION OF MERCAPTANS AND THE REMOVAL OF GUMS CONTAINED IN A SOUR PETROLEUM DISTILLATE

[75] Inventor: David H. J. Carlson, Park Ridge, Ill.

[73] Assignee: UOP Inc., Des Plaines, Ill.

[21] Appl. No.: 214,856

[22] Filed: Dec. 10, 1980

Related U.S. Application Data

[63] Continuation-in-part of Ser. No. 143,119, Apr. 23, 1980, which is a continuation of Ser. No. 958,303, Nov. 6, 1978, Pat. No. 4,206,043.

[51] Int. Cl.³ .................. B01J 31/08; B01J 31/22
[52] U.S. Cl. ........................ 252/431 N; 208/206; 208/207
[58] Field of Search .................. 252/431 N

[56] References Cited

U.S. PATENT DOCUMENTS

| 2,651,595 | 9/1953 | Moulthrop | 196/29 |
| 3,108,081 | 10/1963 | Gleim et al. | 252/431 N X |
| 3,108,948 | 10/1963 | Ring | 208/189 |
| 3,144,403 | 8/1964 | Jacob | 208/207 |
| 3,392,111 | 7/1968 | Napier et al. | 208/191 |
| 3,396,123 | 8/1968 | Urban | 252/428 |
| 4,070,307 | 1/1978 | Carlson | 252/431 N X |
| 4,113,604 | 9/1978 | Carlson | 208/206 |

Primary Examiner—Patrick Garvin
Attorney, Agent, or Firm—James R. Hoatson, Jr.; Gregory J. Mancuso; William H. Page, II

[57] ABSTRACT

A catalytic composite comprising a metal chelate mercaptan oxidation catalyst impregnated on a basic anion exchange resin is disclosed. The catalytic composite is particularly useful to effect the oxidation of mercaptans contained in a sour petroleum distillate.

11 Claims, No Drawings

CATALYTIC COMPOSITE PARTICULARLY USEFUL FOR THE OXIDATION OF MERCAPTANS AND THE REMOVAL OF GUMS CONTAINED IN A SOUR PETROLEUM DISTILLATE

CROSS-REFERENCE TO RELATED APPLICATIONS

This application is a continuation-in-part of my prior, copending application Ser. No. 143,119 filed on Apr. 23, 1980, which in turn is a continuation of my prior application Ser. No. 958,303 filed on Nov. 6, 1978 and now U.S. Pat. No. 4,206,043. All the teachings of both applications are hereby incorporated herein by reference.

BACKGROUND OF THE INVENTION

This invention relates to a gum-resistant catalytic composite particularly adapted to the conversion of mercaptans contained in a sour petroleum distillate. Processes for the treatment of sour petroleum distillates wherein the distillate is treated in contact with a catalyst in the presence of an oxidizing agent at alkaline reaction conditions have become well-known and widely practiced in the petroleum refining industry. Said processes are typically designed to effect the oxidation of offensive mercaptans contained in a sour petroleum distillate with the formation of innocuous disulfides—a process commonly referred to as sweetening. Depending on the source of the petroleum from which the sour petroleum distillate was derived, the boiling range of the distillate itself, and the method of processing the petroleum to produce the distillate, the distillates will vary widely with respect to the concentration, molecular weight and complexity of the mercaptans contained therein. For example, in lighter mercaptan-containing petroleum distillates such as straight run gasolines, the mercaptans are primarily lower alkyl mercaptans which are readily oxidized to disulfides. On the other hand, mercaptan-containing gasolines derived from fluid catalytic cracking (FCC) processes are frequently relatively high in olefin content and comprise mercaptans which are more difficult to convert to disulfides, for example, aromatic and higher molecular weight branched chain alkyl mercaptans.

Heretofore, catalytic composites for the conversion of mercaptans contained in sour petroleum distillates were usually prepared by using as a support charcoal particles. Although such composites perform satisfactorily under many circumstances, the use of charcoal has resulted in limitations in the preparation and use of the catalyst. Because charcoal possesses only moderate attrition resistance, methods of preparation and use of the composite which require or result in agitation of the charcoal particles tend to attrit the particles. Attrition resistance is particularly desired of a catalyst which is prepared, used, or transported in large volumes.

Further, and more importantly, the quality of petroleum distillates required to be treated has been reducing in recent years. As a result of the diminishing supply of petroleum reserves, stocks having a relatively low content of gums and other polymeric compounds are less available. Because distillates having high gum content can cause numerous problems during processing, such as fouling catalysts, it is increasingly necessary to develop catalysts which are resistant to gum accumulation and resultant deactivation.

The catalytic composite of this invention combines the desirable characteristics of having a high physical strength and resistance to attrition, the ability to convert to disulfides the mercaptans in a sour petroleum distillate at least as well as prior art catalysts, and the ability superior to prior art catalysts to resist accumulation of the gum content of the distillate being treated. The physical strength of the catalytic composite of this invention allows more severe conditions of preparation and use of the catalytic composite. The ability to sweeten a petroleum distillate having a high gum content means that the process of sweetening sour petroleum distillates can be performed more efficiently. The catalytic composite of this invention provides processors of sour petroleum distillates with an alternative useful method of treating such stocks to produce saleable products.

SUMMARY OF THE INVENTION

It is an object of this invention to present a novel catalytic composite particularly useful in the treatment of sour petroleum distillates, especially the mercaptan-containing gasolines derived from fluid catalytic cracking processes.

In one of its broad aspects, the present invention embodies a regeneratable, gum resistant catalytic composite for sweetening a sour petroleum distillate, prepared by the method comprising:
(a) washing a basic anion exchange resin with an alcohol;
(b) contacting said basic anion exchange resin with an aqueous caustic solution of a metal chelate mercaptan oxidation catalyst to produce a catalyst-impregnated basic anion exchange resin; and
(c) drying said catalyst-impregnated basic anion exchange resin.

One of the more specific embodiments concerns the foregoing catalytic composite wherein said metal chelate comprises a metal phthalocyanine and said anion exchange resin comprises a porous styrene-divinylbenzene cross-linked polymer matrix.

A still more specific embodiment relates to the foregoing catalytic composite wherein from about 0.1 to about 2 wt. % cobalt phthalocyanine monosulfonate is impregnated on an amine anion exchange resin comprising a porous styrene-divinylbenzene cross-linked polymer matrix and tertiary amine functional groups.

Other objects and embodiments of this invention will become apparent in the following more detailed specification.

DESCRIPTION OF THE INVENTION

The catalytic composite of this invention comprises a regeneratable, gum resistant catalytic composite for sweetening a sour petroleum distillate, prepared by the method comprising:
(a) washing a basic anion exchange resin with an alcohol;
(b) contacting said basic anion exchange resin with an aqueous solution of a metal chelate mercaptan oxidation catalyst to produce a catalyst-impregnated basic anion exchange resin; and
(c) drying said catalyst-impregnated anion exchange resin.

There are a variety of basic anion exchange resins suitable for use in accordance with the present invention. Amine anion exchange resins are preferred. The basic anion exchange resins will typically comprise primary, secondary, tertiary and/or quaternary amine functional groups. Those anion exchange resins comprising predominantly tertiary amine functional groups, for example, dimethylaminomethyl functional groups, are among the more effective anion exchange resins. Further, certain basic anion exchange resins comprising cross-linked monoethylenically unsaturated monomer-polyvinylidiene monomer copolymer matrices have desirable surface area and high pore diameter properties affording greater access to a larger number of functional groups. Cross-linked styrene-polyvinyl copolymers are a notable example. Other monoethylenically unsaturated monomers, for example, alphamethylstyrene, mono- and polychlorostyrenes, vinyltoluene, vinylanisole, vinylnaphthalene, and the like, have been disclosed as being copolymerizable with other polyvinylidiene monomers, for example, trivinylbenzene, divinylnaphthalene, divinylethene, trivinylpropene, and the like, to form desirable cross-linked copolymer matrices. Preferred anion exchange resins include amine anion exchange resins comprising a porous styrene-divinylbenzene cross-linked copolymer matrix, including such amine anion exchange resins having primary, secondary, tertiary, and/or quaternary amine functional groups. Amberlyst A-21, described as a weakly basic anion exchange resin comprising a porous cross-linked styrenedivinylbenzene copolymer matrix having tertiary amine functional groups, is a preferred anion exchange resin. Anion exchange resins manufactured under the trade name Amberlyst A-29 and Duolite A-7 are exemplary of a commercial anion exchange resin which can be employed. The former is described as an intermediate strength anion exchange resin and the latter is described as a weakly basic anion exchange resin comprising secondary and tertiary amine functional groups.

The anion exchange resin is generally available as a spherical particulate of about 20–50 mesh (0.41 to 0.51 mm diameter). The charcoal particles commonly used as mercaptan oxidation catalyst supports usually are of 10–30 mesh in size. The greater strength of the basic anion exchange resins allow easier handling of the resins than the charcoal particles.

Generally, weakly basic anion exchange resins, the preferred resin constituent of this invention, have a surface area of from about 30 to about 40 square meters per gram, an average pore diameter of from about 900 to about 1300 Angstroms, and a porosity of from about 44% to about 56%.

The metal chelate mercaptan oxidation catalyst employed as a component of the catalytic composite of this invention can be any of the various metal chelates known to the treating art as effective to catalyze the oxidation of mercaptans contained in a sour petroleum distillate with the formation of polysulfide oxidation products. Said chelates include the metal compounds of tetrapyridinoporphyrazine described in U.S. Pat. No. 3,980,582, e.g., cobalt tetrapyridinoporphyrazine, porphyrin and metalloporphyrin catalyst as described in U.S. Pat. No. 2,966,453, e.g., cobalt tetraphenylporphyrinsulfonate; corrinoid catalyst as described in U.S. Pat. No. 3,252,892, e.g., cobalt corrin sulfonate; chelate organometallic catalyst such as described in U.S. Pat. No. 2,918,426, e.g., the condensation product of an aminophenol and a metal of Group VIII and the like. Metal phthalocyanines are a preferred class of metal chelate mercaptan oxidation catalyst.

The metal phthalocyanines employed as mercaptan oxidation catalysts generally include magnesium phthalocyanine, titanium phthalocyanine, hafnium phthalocyanine, vanadium phthalocyanine, tantalum phthalocyanine, molybdenum phthalocyanine, manganese phthalocyanine, iron phthalocyanine, cobalt phthalocyanine, nickel phthalocyanine, platinum phthalocyanine, palladium phthalocyanine, copper phthalocyanine, silver phthalocyanine, zinc phthalocyanine, tin phthalocyanine and the like. Cobalt phthalocyanine and vanadium phthalocyanine are particularly preferred. The metal phthalocyanine is most frequently employed as a derivative thereof, the commercially available sulfonated derivatives, e.g., cobalt phthalocyanine monosulfonate, cobalt phthalocyanine disulfonate or a mixture thereof, being particularly preferred. The sulfonated derivatives may be prepared, for example, by reacting cobalt, vanadium or other metal phthalocyanine with fuming sulfuric acid. While the sulfonated derivatives are preferred, it is understood that other derivatives, particularly the carboxylated derivatives may be employed. The carboxylated derivatives are readily prepared by the action of trichloroacetic acid on the metal phthalocyanine.

The metal chelate mercaptan oxidation catalyst is readily disposed on the basic anion exchange resin of this invention. In general, up to about 25 wt. % metal phthalocyanine can be disposed on the anion exchange resin and still form a stable catalytic composite. A lesser amount in the range of from 0.1 to about 10 wt. % generally forms a suitably active catalytic composite although the activity advantage derived from concentrations in excess of about 2 wt. % does not appear to warrant the use of higher concentrations.

The anion exchange resin is advantageously washed with alcohol prior to contacting with the selected metal chelate mercaptan oxidation catalyst. The alcohol wash has proven to be a key factor in the manufacture of a catalytic composite suitably active with respect to the conversion of mercaptans contained in a sour petroleum distillate. Methyl alcohol is a preferred washing agent, largely because it is readily available and relatively inexpensive. The volume of alcohol which can be used advantageously ranges from about 2 to about 5 times the volume of the anion exchange resin. Washing can be performed at any convenient temperature. Washing at ambient temperature is preferred, although temperatures in the range of from about 65° F. to about 150° F. can be used advantageously.

The selected metal chelate mercaptan oxidation catalyst can be contacted with the anion exchange resin in any conventional or otherwise convenient manner from an aqueous solution and/or dispersion thereof to produce a catalyst-impregnated basic anion exchange resin. The preferred aqueous solution is a dilute aqueous solution comprising from about 7 wt. % to about 10 wt. % of a strong base, such as a dilute aqueous solution of sodium hydroxide.

Contacting is suitably effected utilizing conventional techniques whereby the anion exchange resin is soaked, suspended, dipped one or more times, or otherwise immersed in an aqueous or alcoholic impregnating solution and/or dispersion to dispose a given quantity of the metal chelate component thereon. One preferred method involves the use of steam-jacketed rotary dryer.

An alternative and convenient method for disposing the metal chelate on the anion exchange resin comprises predisposing the anion exchange resin in a sour petroleum distillate treating zone or chamber as a fixed bed and passing the metal chelate solution and/or dispersion through the bed in order to form the catalytic composite in situ. The method allows the solution and/or dispersion to be recycled one or more times to achieve a desired concentration of the metal chelate component on the anion exchange resin. In still another alternative method, the anion exchange resin may be predisposed in said treating zone or chamber, and the zone or chamber thereafter is filled with the metal chelate solution and/or dispersion to soak the resin for a predetermined period.

After contacting the basic anion exchange resin with the aqueous solution of a metal chelate mercaptan oxidation catalyst, the catalyst-impregnated basic anion exchange resin is dried to produce a catalytic composite. The drying can be accomplished in any conventional or otherwise convenient manner. As stated above, one preferred method involves the use of a steam-jacketed rotary dryer. The anion exchange resin is immersed in the impregnating solution and/or dispersion contained in the dryer and the resin is tumbled therein by the rotating motion of the dryer. Evaporation of the solution in contact with the tumbling anion exchange resin is expedited by applying steam to the dryer jacket. In any case, the resulting composite is allowed to dry under ambient temperature conditions, or in flow of hot gases, or in any other suitable manner. Suitable drying temperatures range from about 65° F. to about 212° F.

The theoretical basis for the superiority of the catalytic composite of this invention in treating sour petroleum distillates having a substantial gum content is unclear. Gums are usally defined as high molecular weight polymers of low volatility which result from the polymerization of peroxides, which in turn are formed by the oxidation of olefins and diolefins. Gums tend to accumulate on surfaces with which they come in contact, including catalytic surfaces. Because of their limited solubility in hydrocarbon streams, gums can quickly accumulate on catalysts isolating catalytic surfaces from reactants and thereby deactivating the catalysts. Catalysts deactivated in such a manner must be periodically regenerated by removal of accumulated gum. Unfortunately, the reactivation process frequently requires severe conditions, such as high temperatures and toxic chemicals, to satisfactorily remove accumulated gums. The reactivation process tends to reduce the physical integrity of the catalytic composite, and also tends to remove metal chelate mercaptan oxidation catalyst from the composite. The catalytic composite of this invention is more resistant than charcoal to physical degradation during use and reactivation because of the higher crush strength and attrition resistance of the resin base compared to a charcoal base. In addition, reactivation to remove accumulated gum deposits is required less frequently for the catalytic composite of this invention because of the lower rate of gum accumulation displayed by the catalytic composite of this invention.

The following Examples are presented in illustration of certain preferred embodiments of this invention and are not intended as an undue limitation on the generally broad scope of the invention as set out in the appended claims.

EXAMPLE I

In the preparation of an anion exchange resin-supported mercaptan oxidation catalyst, 100 cc of a weak base anion exchange resin (Amberlyst A-21) containing tertiary amine functional groups was washed with four volumes of methanol, dried on a steam bath, and thereafter contacted with an aqueous caustic solution of cobalt phthalocyanine monosulfonate. The aqueous caustic solution consisted of 150 mg of cobalt phthalocyanine monosulfonate dissolved in 125 ml of a 7 wt. % aqueous caustic solution. The anion exchange resin, in the form of 0.4–0.55 mm beads, was immersed in the aqueous caustic solution, and the solution was stirred in contact with the anion exchange resin for about 5 minutes. The resin was thereafter maintained in the solution under quiescent conditions for about 1 hour after which the solution was evaporated to dryness in contact with the resin over a steam bath. The resin was subsequently oven-dried at about 100° C. for one hour. The catalyst of this example is hereinafter referred to as Catalyst A.

EXAMPLE II

Catalyst B was prepared substantially as described except that the anion exchange resin employed was a strong base anion exchange resin (Amberlyst A-26) containing quaternary ammonium hydroxide functional groups. Thus, 100 cc of a strong base anion exchange resin (Amberlyst A-26) containing tertiary amine functional groups was impregnated with an aqueous caustic solution of cobalt phthalocyanine monosulfonate, the anion exchange resin having been previously washed with about four volumes of methanol. The aqueous caustic solution consisted of 150 mg of cobalt phthalocyanine monosulfonate dissolved in 125 ml of a 7 wt. % aqueous caustic solution. The anion exchange resin, in the form of 0.4–0.55 mm beads, was immersed in the solution, and the solution was stirred in contact with the anion exchange resin for about 5 minutes. The resin was thereafter maintained in the solution under quiescent conditions for about 1 hour after which the solution was evaporated to dryness in contact with the resin over a steam bath. The resin was subsequently oven-dried at about 100° C. for one hour. The catalyst of this example is hereinafter referred to as Catalyst B.

EXAMPLE III

In this example, an activated charcoal supported cobalt phthalocyanine monosulfonate catalyst was prepared in accordance with conventional practice by adsorbing the cobalt phthalocyanine monosulfonate on an activated charcoal support from a methanolic dispersion thereof. Thus, 150 mg of cobalt phthalocyanine monosulfonate was admixed with 50 ml of methanol and stirred for about 5 minutes. The resulting dispersion was then further diluted to 300 ml with methanol with an additional 5 minutes of stirring. About 100 cc of the activated charcoal particles, having an average bulk density of about 0.25 gm/cc and a particle size in the 10×30 mesh range, was immersed in the methanol dispersion, and the dispersion was stirred in contact with the particles for about 5 minutes and then maintained in contact with the particles for 1 hour under quiescent conditions. The methanolic dispersion was thereafter evaporated to dryness over a steam bath in contact with the charcoal particles, and the resulting impregnated particles were subsequently oven dried at 100° C. for one hour. The catalyst of this example is hereinafter referred to as Catalyst C.

EXAMPLE IV

A comparative evaluation of the catalytic composites of the foregoing examples was effected in the following manner. In each case the test was effected in an air atmosphere at ambient conditions of temperature and pressure. In each case, 13.3 cc of the catalyst and 100 cc of sour gasoline were admixed in a closed glass vessel. However, in the case of Catalyst C, the conventional catalyst, the catalyst was wetted with 5 cc of 7 wt. % aqueous sodium hydroxide solution prior to admixing the catalyst with the gasoline. Catalyst A and Catalyst B were not wetted with sodium hydroxide solution. Thereafter, the glass vessels were placed in a mechanical shaking device and shaken. The gasoline in each glass vessel was analyzed periodically for residual mercaptan sulfur and for gum. The gasoline used in each example was a raw debutanized FCC gasoline boiling in the 112° F. to 448° F. range and containing 58 ppm mercaptan sulfur. The results of the tests are tabulated below in Table I.

TABLE I

| Time, min. | Mercaptan Sulfur, ppm. Catalyst | | | Gum, mg/100 cc Catalyst | | |
|---|---|---|---|---|---|---|
| | A | B | C | A | B | C |
| 0 | 58 | 58 | 58 | 1.5 | 1.5 | 1.5 |
| 5 | 1 | 5 | 1 | Not Analyzed | | |
| 15 | 1 | 4 | 1 | 1.5 | 0.7 | 1.3 |
| 30 | 1 | 2 | 1 | 0.6 | 0.2 | 1.2 |

EXAMPLE V

A portion of Catalyst A was evaluated to determine its resistance to deactivation. Three consecutive tests were conducted with the same portion of Catalyst A. In each test raw debutanized FCC gasoline was used. In each test, the 13.3 cc sample of Catalyst A and 100 cc of gasoline were contained in a closed vessel with air at ambient temperature and pressure, and the glass vessel was inserted in a mechanical shaking device. The gasoline was shaken in contact with the catalyst and analyzed for residual mercaptan sulfur after 120 minutes in each test. The results are tabulated in Table II below.

TABLE II

| Time, Min. | Mercaptan Sulfur, wt. ppm. Test | | |
|---|---|---|---|
| | 1 | 2 | 3 |
| 0 | 34 | 34 | 34 |
| 120 | 3 | 2 | 3 |

Examination of the results shows that:

(i) The dry catalytic composite of this invention is at least as effective in treating a sour petroleum distillate as a conventional catalyst which has been wetted with caustic solution prior to being exposed, in a caustic-wet state, to the petroleum to be treated.

(ii) The catalytic composite of this invention is superior to the conventional catalyst in ability to resist accumulation of gum from the stock being treated.

(iii) The catalytic composite of this invention is resistant to deactivation by raw sour gasoline under severe conditions.

I claim:
1. A regeneratable, gum resistant catalytic composite for sweetening a sour petroleum distillate, prepared by the method comprising:
   (a) washing a basic anion exchange resin with an alcohol;
   (b) contacting said basic anion exchange resin with an aqueous caustic solution of a metal phthalocyanine mercaptan oxidation catalyst to produce a catalyst-impregnated basic anion exchange resin; and
   (c) drying said catalyst-impregnated basic anion exchange resin.
2. The catalytic composite of claim 1 wherein said anion exchange resin is an amine anion exchange resin.
3. The catalyst composite of claim 1 wherein said anion exchange resin is an amine anion exchange resin comprising a porous styrene-divinylbenzene cross-linked copolymer matrix.
4. The catalytic composite of claim 1 wherein said anion exchange resin is an amine anion exchange resin comprising a porous styrene-divinylbenzene cross-linked copolymer matrix and primary amine functional groups.
5. The catalytic composite of claim 1 wherein said anion exchange is an amine anion exchange resin comprising a porous styrene-divinylbenzene cross-linked copolymer matrix and secondary amine functional groups.
6. The catalytic composite of claim 1 wherein said anion exchange resin is an amine anion exchange resin comprising a porous cross-linked styrene-divinylbenzene copolymer matrix having tertiary amine function groups.
7. The catalytic composite of claim 1 wherein said anion exchange resin is an amine anion exchange resin comprising a porous styrene-divinylbenzene cross-linked copolymer matrix and quaternary amine functional groups.
8. The catalytic composite of claim 1 wherein said metal phthalocyanine mercaptan oxidation catalyst comprises from about 0.1 to about 10 wt. % of said catalytic composite.
9. The catalytic composite of claim 1 wherein said metal phthalocyanine mercaptan oxidation catalyst comprises from about 0.1 to about 2 wt. % of said catalytic composite.
10. The catalytic composite of claim 1 wherein said metal phthalocyanine mercaptan oxidation catalyst is cobalt phthalocyanine.
11. The catalytic composite of claim 1 wherein said metal phthalocyanine mercaptan oxidation catalyst is cobalt phthalocyanine monosulfonate.

* * * * *